United States Patent [19]

Begault

[11] Patent Number: 5,173,944
[45] Date of Patent: Dec. 22, 1992

[54] HEAD RELATED TRANSFER FUNCTION PSEUDO-STEREOPHONY

[75] Inventor: Durand R. Begault, San Francisco, Calif.

[73] Assignee: The United States of America as represented by the Administrator of the National Aeronautics and Space Administration, Washington, D.C.

[21] Appl. No.: 826,749

[22] Filed: Jan. 29, 1992

[51] Int. Cl.⁵ .............................................. H04R 5/00
[52] U.S. Cl. ....................................... 381/17; 381/24; 381/26
[58] Field of Search ...................... 381/17, 25, 26, 18, 381/24

[56] References Cited

U.S. PATENT DOCUMENTS

| | | |
|---|---|---|
| 4,118,599 | 10/1978 | Iwahara et al. . |
| 4,139,728 | 2/1979 | Haramoto et al. . |
| 4,192,969 | 3/1980 | Iwahara . |
| 4,219,696 | 8/1980 | Kogure et al. . |
| 4,308,424 | 12/1981 | Bice, Jr. ................................. 381/17 |
| 4,309,570 | 1/1982 | Carver . |
| 4,359,605 | 11/1982 | Haramoto et al. . |
| 4,388,494 | 6/1983 | Schone et al. . |
| 4,603,429 | 7/1986 | Carver . |
| 4,739,513 | 4/1988 | Kunugi et al. . |
| 4,856,064 | 8/1989 | Iwamatsu . |
| 5,105,462 | 4/1992 | Lowe et al. ............................ 381/17 |

Primary Examiner—Jin F. Ng
Assistant Examiner—Edward Lefkowitz
Attorney, Agent, or Firm—Darrell G. Brekke; Guy Miller; John R. Manning

[57] ABSTRACT

An apparatus for producing pseudo-stereophonic sound from a monaural signal including a monaural source having a first speaker disposed in an anechoic room and having a sound output generated by the monaural signal. Second, third, fourth and fifth speaker disposed in the anechoic room (substantially) symmetrically about a listener having two ears. The monaural signal from the source is processed to output processed signals to each of the second, third, fourth and fifth speakers, each speaker producing a sound output corresponding to the received processed signal. A pair of microphones are disposed in the ears of the listener for receiving the sound outputs of the first, second, third, fourth and fifth speakers and producing two differentiated audio channels.

12 Claims, 5 Drawing Sheets

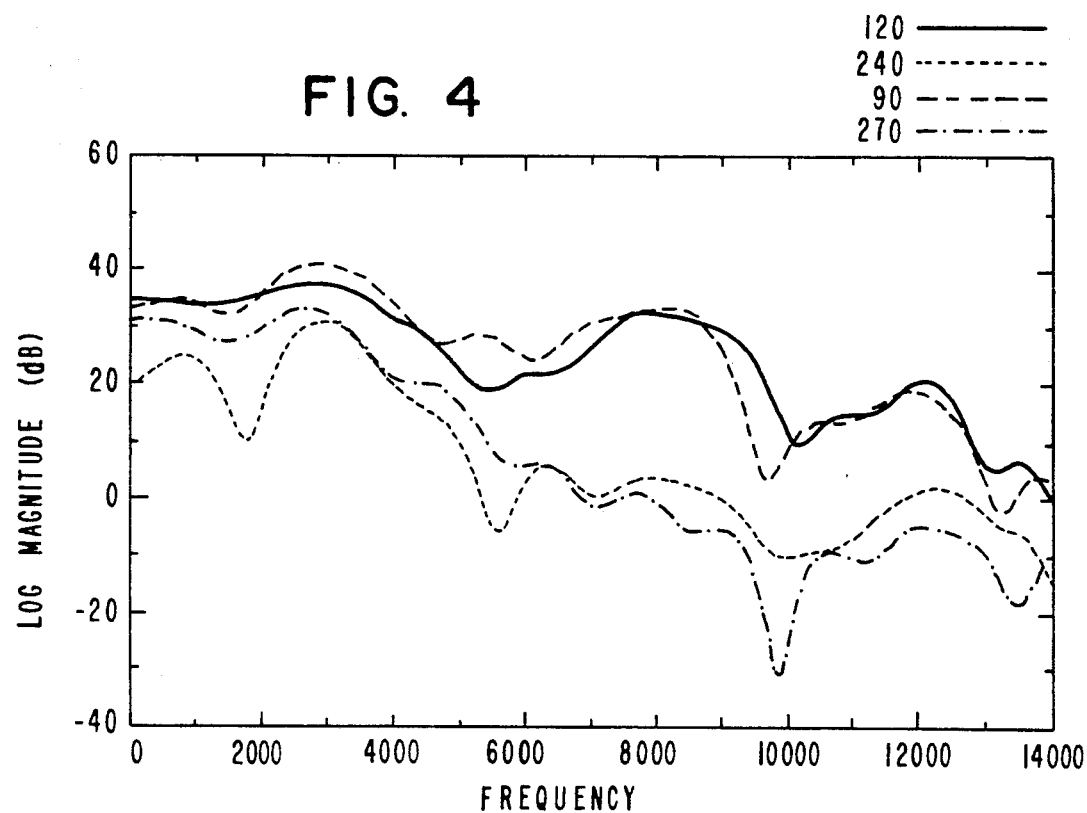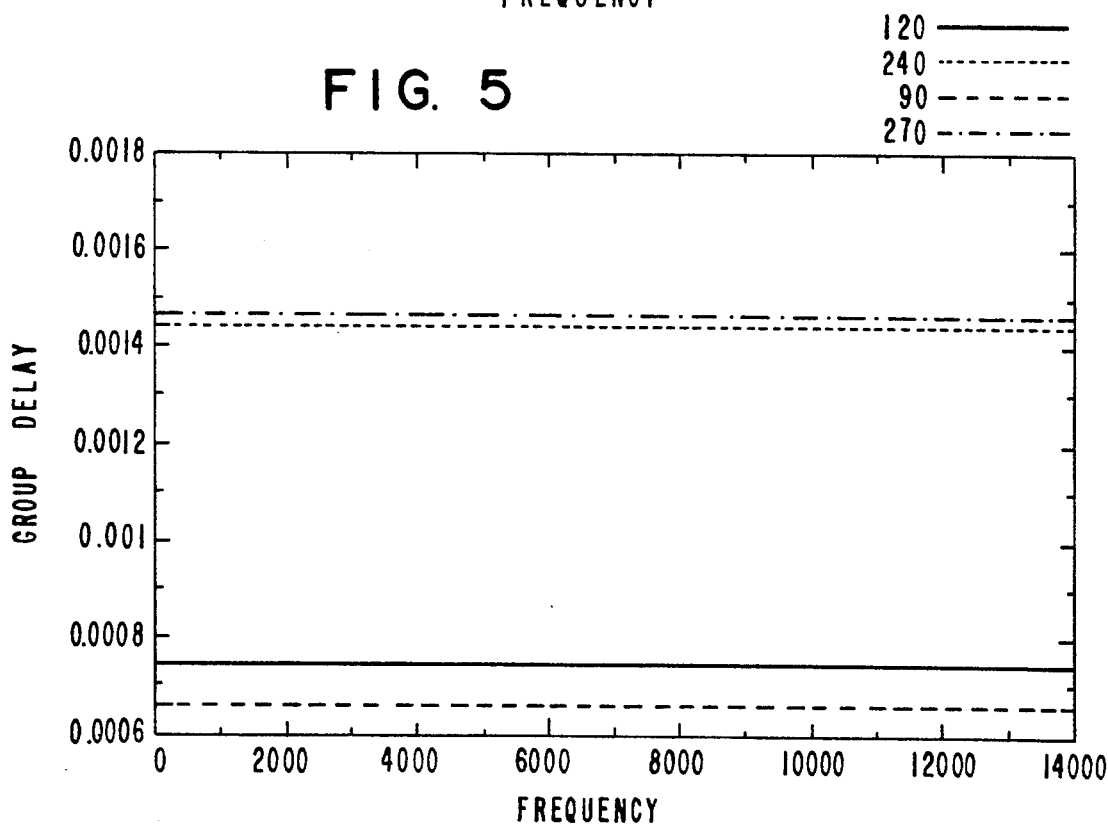

HEAD RELATED TRANSFER FUNCTION PSEUDO-STEREOPHONY

ORIGIN OF THE INVENTION

The invention described herein was made in the performance of work under a NASA contract and is subject to Public Law 96-517 (35 U.S.C. 200 et seq.). The contractor has assigned his rights thereunder to the Government.

BACKGROUND OF THE INVENTION

1. Technical Field of the Invention

The present invention relates generally to the field of stereophony and, more specifically, to a head related transfer function pseudo-stereophony in which two differentiated audio channels are derived from a single channel.

2. Description of the Prior Art

"Pseudo-stereophony" is a generic description of a family of techniques that allow the derivation of two channels of sound from a monaurally-recorded, one channel source. Signal processing techniques for achieving pseudo-stereophony have existed for at least thirty-six years, a time period roughly paralleling the commercial introduction of home stereo systems. In general, these techniques all involve a process where the two channels of output are derived according to a decorrelation process, i.e., the monaural input is processed to each channel in a differential manner so as to create two non-coherent signals. One technique, known as differential filtering, uses a high-pass filter for output channel one and a low-pass filter for output channel two. Other differential filtering techniques have used two comb filters with complimentary frequency responses, or two all-pass filters with differential phase response.

Another type of pseudo-stereophony can be referred to as reverberation and time delay techniques where, for example, the technique involves adding differentially time delayed, scaled versions of the signal to each output channel, with the possibility of adding recirculated sound.

Yet another type of pseudo-stereophony involves differential sub-audio frequency modulation of the output channels. This is sometimes called "pitch shifting".

The aforementioned techniques suffer from one or more drawbacks, including the overt "coloration" of the sounds timbre in each separate channel of the output. Also, with loudspeaker reproduction the listener is required to sit near the center of the speakers. Further, there is a general inability to mix the pseudo-stereo output to monaural without disturbing the timbral distortions. Also, with stereo reverberation techniques, the problem of additional reverberation time is appreciable. The sound becomes "muddy" (overly reverberant) as a result of convolving an originally reverberant signal with the reverberation of the signal processor (and eventually that of the listening space).

The pinnae of the human ears are shaped to provide a transfer function for received audio signals and thus have a characteristic frequency and phase response for a given angle of incidence of a source to a listener. This characteristic response is convolved with sound that enters the ear and contributes substantially to our ability to listen spatially. This is known as the "head related transfer function" (HRTF). The HRTF was described by Jens Blauret in "The Psychophysics of Human Sound Localization", MIT Press, Cambridge, 1983.

HRTFs have been mentioned in some U.S. patents. For example, U.S. Pat. No. 4,388,494, issued to Schone et al describes a pseudo-stereophonic reproduction circuit utilizing HRTFs. Similarly, U.S. Pat. No. 4,359,605, issued to Haramoto et al describes pseudo-stereophonic signal generation utilizing HRTFs.

U.S. Pat. No. 4,219,696, issued to Kooure et al, discloses stereo signal generation having localized sound images dependent on HRTFs. U.S. Pat. No. 4,192,969 discloses HRTF-related stereophonic signal generation with gauged adjustable attenuators for variable frequency correlation and response.

A continuing need exists for improved pseudo-stereophonic signal generation capable of producing two channel sound derived from a monaural source.

SUMMARY OF THE INVENTION

An object of the present invention is to derive two differentiated audio channels from a single channel based on the head related transfer function.

Another object of the present invention is to provide a method and apparatus for producing pseudo-stereophony which avoids coloration of the sound timbre in each separate channel of a two channel output derived from a single channel source.

Another object of the present invention is to provide a method and apparatus for producing pseudo-stereophony in which the listener is not required to be positioned in the center of two speakers.

Yet another object of the present invention is to provide a method and apparatus for producing pseudo-stereophonic output channels which can be mixed to monaural (one channel) without disturbing coloration effects that result from phase cancellation.

Still another object of the present invention is to provide a method and apparatus for producing pseudo-stereophony in which the sound image has an increased dimension of spaciousness.

These and other objects of the present invention are met by providing an apparatus for producing pseudo-stereophonic sound from a monaural signal. The apparatus is based on the concept of a monaural source having a first speaker disposed in an anechoic room, the first speaker having a sound output based on the monaural signal, a second, third, fourth and fifth speaker disposed in the anechoic room substantially symmetrically about a listener having two ears, signal processing means for receiving the monaural signal from the source and outputting processed signals to each of the second, third, fourth and fifth speakers, each speaker producing a sound output corresponding to the received processed signals, and a pair of microphones, one disposed in each ear of a listener for receiving the sound outputs of the first through fifth speakers and producing two differentiated audio channels. Preferably, the signal processing means includes a gain unit which increases the monaural signal to the second, third, fourth and fifth speakers, and four variable delay units, one corresponding to each of the second, third, fourth and fifth speakers.

In another aspect of the present invention, a method for producing pseudo-stereophonic sound from a monaural signal includes the steps of feeding a monaural input signal to an A/D converter to produce a digitized output signal, distributing the digitized output signal across six lines to produce six digital output signals, passing two of the six output signals respectively to left and right summation devices, passing each of the remaining four output signals through individual delay devices to establish four different delayed signals, multiplying each of the four different delayed signals by a common value, filtering each of the four multiplied signals through FIR filters having an impulse frequency response matching ipsilateral and contralateral magnitude responses of the head related transfer functions of an average listener and a linear phase response to produce left and right channel output signals, summing the left channel output signals with the unprocessed digital signal in the left summation device, summing the right channel output signals with the unprocessed digital signal in the right summation device, and converting the summed signals in a D/A converter to produce analog left and right channel signals.

These and other features and advantages of the method and apparatus for producing pseudo-stereophonic sound according to the present invention will become more apparent with reference to the following detailed description and drawings.

BRIEF DESCRIPTION OF THE DRAWINGS

FIG. 4 shows the frequency response for filters based on the free-field HRTF for positions at 0 degrees elevation, and at 90, 120, 240 and 270 degrees azimuth;

FIG. 5 shows the group delay response for filters based on the free-field HRTF for positions at 0 degrees elevation, and at 90, 120, 240 and 270 degrees azimuth;

DETAILED DESCRIPTION OF THE INVENTION

Figure 1:
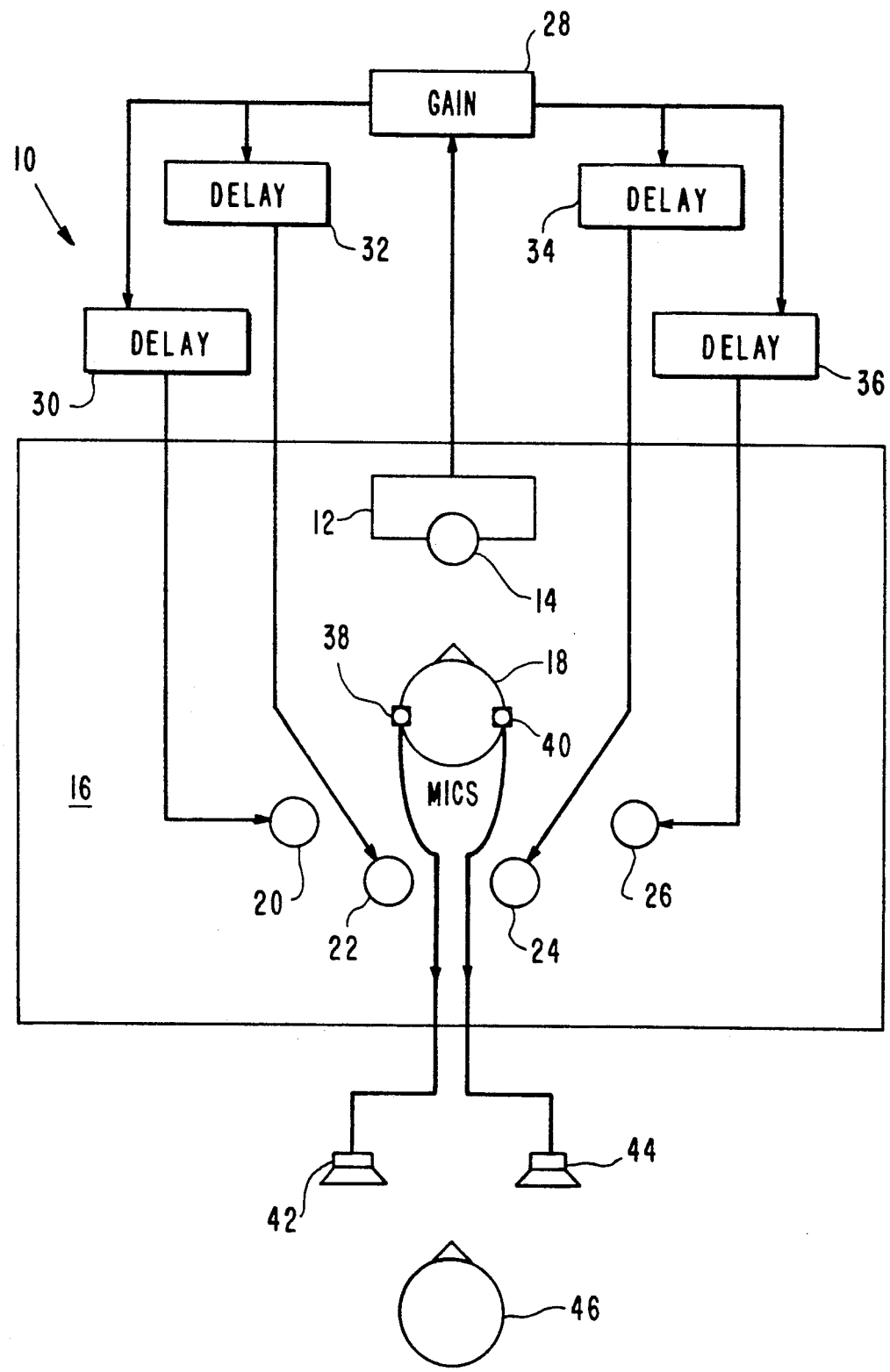
FIG. 1 is a schematic view of a first embodiment of the present invention.

Referring now to FIG. 1, a pseudo-stereophony apparatus is generally referred to by the numeral 10 and includes a monaural sound source 12 having an associated speaker 14. The speaker is driven by a sound signal produced by the source 12 to thereby generate audible sound waves. The speaker 14 is positioned in an anechoic chamber 16, such as a sound-proof room, directly in front of a listener 18 having a pair of ears. Four additional speakers 20, 22, 24 and 26 are placed at ear level around the listener 18 at 90°, 120°, 240° and 270° azimuth, respectively. These four additional speakers receive a processed version of the signal emitted from the monaural speaker 14. The loudness of the signal is first boosted by a gain unit 28 and then is fed in parallel to four individual variable delay units 30, 32, 34 and 36, each serving one of the four speakers 20, 22, 24 and 26.

Two probe microphones 38 and 40 are placed inside the ears of a listener whose pinnae match the average shape and transfer function of an average listener. The two channel signal for the pseudo-stereophonic output is obtained from the output of the two microphones, which can be delivered to a left channel speaker 42 and a right channel speaker 44 which produce pseudo-stereophonic sound for a listener 46.

Microphones are placed inside of the ears of the listener to capture the characteristic frequency and phase response for a given angle of incidence from a source to a listener. This characteristic response is convolved with sound that enters the ear and contributes substantially to our ability to listen spatially. This is known as the "head related transfer function" (HRTF), as described in the aforementioned article by Jens Blauret in his article "Spatial Hearing: The Phytophysics of Human Sound Localization" MIT Press, Cambridge, 1983, this article being incorporated herein by reference.

It is possible to simulate the characteristic frequency and phase response described above by means of digital filtering according to the present invention. An effective simulation of the spatial dimensions of sound can be achieved by using filters whose impulse response and group delay characteristics match the free-field or monaural HRTF of the two ears of the listener. With speakers, spatial effects can also be obtained with HRTF filtering that are impossible to accomplish with other methods. This includes the ability to move the virtual sound image beyond the arc defined by stereo loudspeakers (so long as each ear is receiving a suitable amount of signal from each speaker).

Figure 2:
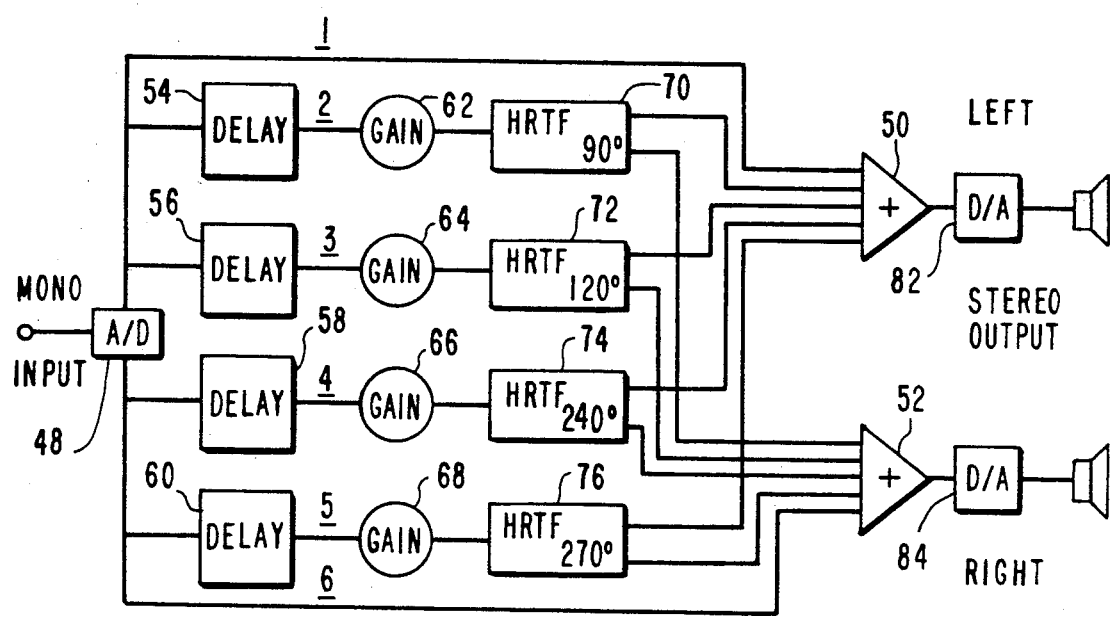
FIG. 2 is a schematic diagram of the present invention showing signal processing corresponding to the embodiment of FIG. 1.

Referring now to FIG. 2, a signal processing arrangement according to the present invention mimics the heuristic description of the invention shown in FIG. 1. The monaural input signal is fed to an analog to digital (A/D) converter 48, typically having a 44.1 kHz sampling rate and 16 bit word length. The digitized signal is then distributed across six lines, numbered 1-6 in FIG. 2. Lines 1 and 6 pass their signal directly to left and right digital summation devices 50 and 52, while lines 2, 3, 4 and 5 each pass through an individual digital delay device 54, 56, 58 and 60. These are either set to fixed values or are interactively set by the user as further described below. The value of time delay used for lines 2, 3, 4 and 5 are all different, as will also be described in more detail below.

The output of each delay device 54, 56, 58 and 60 is passed through an individual digital multiply device or gain devices 62, 64, 66, and 68. The value added to each signal by the gain devices is identical and are nominally set to a value whereby the signal of lines 2, 3, 4 and 5 are each increased by for example, six dB above the amplitude level of lines 1 and 6. The value of the multiply can be adjusted by the user.

Figure 3:
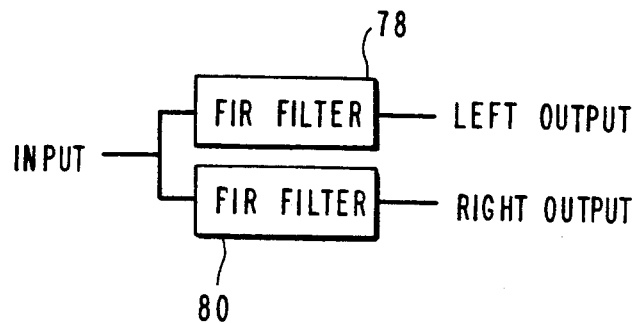
FIG. 3 is a more detailed schematic view of each of the eight HRTF filter networks of FIG. 2.
Figure 6:
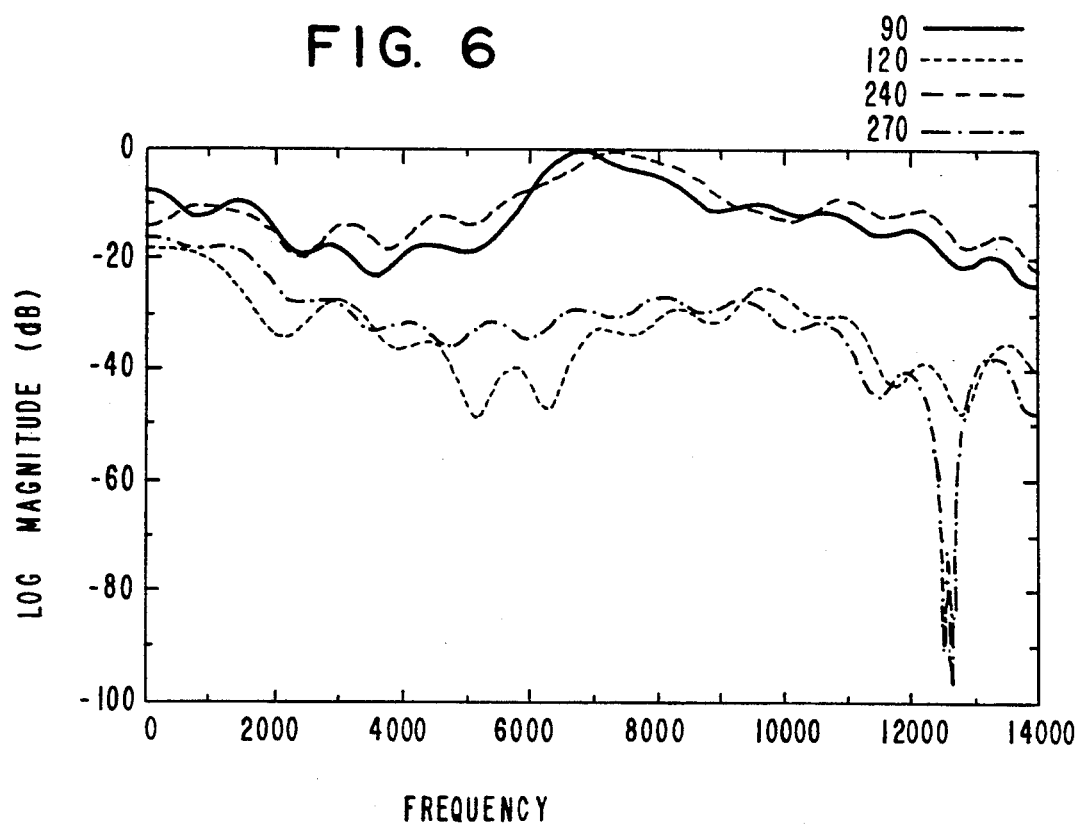
FIG. 6 shows the frequency response for filters based on the monaural HRTF for positions at 0 degrees elevation, and at 90, 120, 240 and 270 degrees azimuth.
Figure 7:
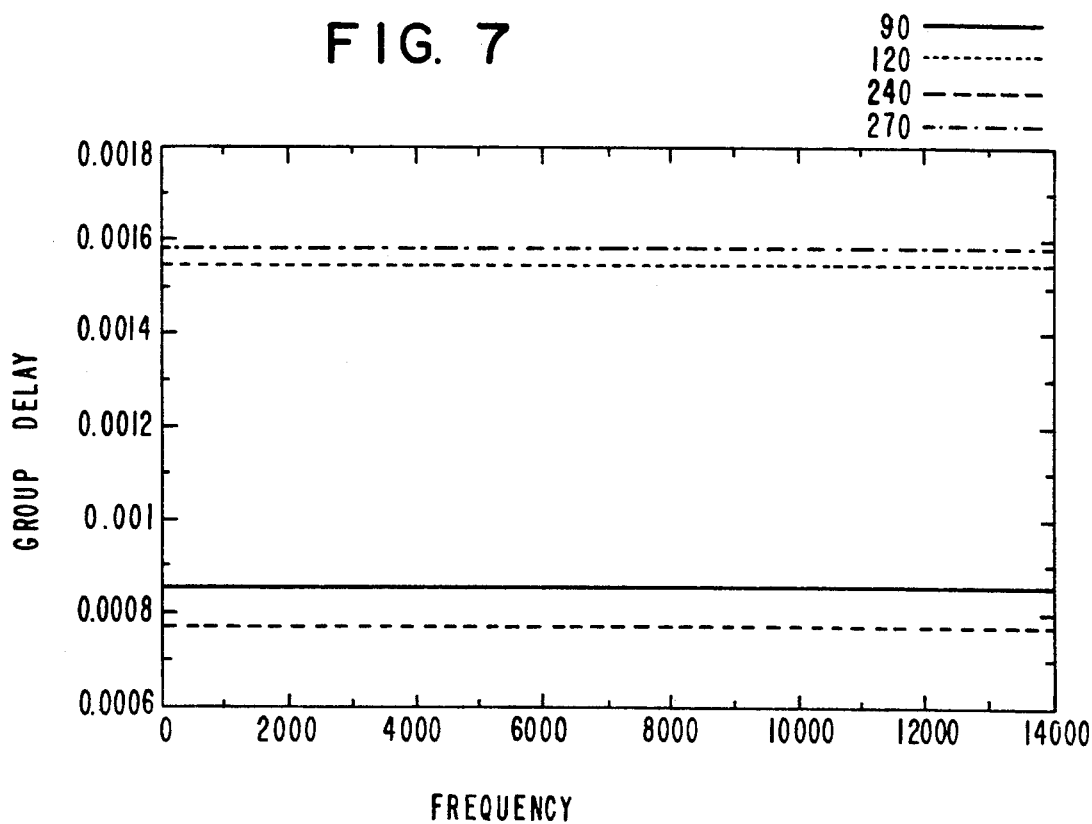
FIG. 7 shows the group delay response for filters based on the monaural HRTF for positions at 0 degrees elevation, and at 90, 12, 240 and 270 degrees azimuth.

The output of each gain device 62, 64, 66 and 68 is fed through a separate HRTF filter network 70, 72, 74, and 76. As shown in FIG. 3, each HRTF filter network includes two FIR (Finite Impulse Response) filters 78 and 80 whose impulse frequency response matches the ipsilateral HRTFs of an average listener at 90, 120, 240 and 270 degrees azimuth, 0 degrees elevation. Each HRTF filter network takes a single input and derives two differentiated outputs, one for each output channel, using the two separate FIR filters 78, 80 shown in FIG. 3. The FIR filter 78 for the left output summed at 50 in FIG. 3 uses a particular frequency and group delay response for a particular angle of incidence, as shown in FIGS. 4 and 5, or alternatively in FIGS. 6 and 7. The FIR filter 80 for the right output summed at 52 in FIG. 3 uses the frequency and group delay responses shown in FIGS. 4 and 5, or alternatively in FIGS. 6 and 7, of the symmetrically opposed angle of incidence of the HRTF measurement used in FIR filter 78. Specifically, referring to FIG. 2. HRTF filter network 70 uses an HRTF measurement for 90 degrees for FIR filter 78 and 270 degrees for FIR filter 80-HRTF filter network 72 uses an HRTF measurement for 120 degrees for FIR filter 78 and 240 degrees for FIR filter 80-HRTF filter network 74 uses an HRTF measurement for 240 degrees for FIR filter 78 and 120 degrees for FIR filter 80; and HRTF filter network 76 uses an HRTF measurement for 270 degrees for FIR filter 78 and 90 degrees for FIR filter 80.

The left output channel of each of the four HRTF filtering networks are summed by the digital summation device 50, along with the unprocessed output of the A/D converter from line 1, while the right output channel of each of the four HRTFs filter networks is summed by the digital summation device 52, along with the unprocessed output of the A/D converter from line 6. The summed output for the left and right channels are then passed through separate digital to analog (D/A) converters 82 and 84.

The parameters of each part of the circuit illustrated in FIG. 2, such as time delays, gains, and HRTF filters, are designed in order to meet specific psychoacoustic criteria described below.

The overall gain of the four delayed sounds are made louder than the direct sound through the use of the digital multiply or gain devices 62, 64, 66 and 68. Each of the four delayed sounds is boosted by six dB. This was determined empirically as the best value for achieving the pseudo-stereophonic effect with a range of different sound materials, such as speech and music. This multiply could also be set by the user via knob setting so that at a minimum setting, the pseudo-stereophony would be effectively by-passed and at a maximum setting, of about 12dB, an exaggerated effect could be produced. For systems not allowing operator interaction, about 6dB would be the optimal fixed value.

With respect to setting the time delays, each delay arrives at the loudspeakers differentially in time. The following temporal dimensions were taken into account for the setting of each value of delay: (1) the initial time gap between the undelayed sound and the first delay; (2) the time between each successive delay; and (3) the time of the final delay, which is a function of the first two parameters. An important psychoacoustic consideration is that the signals remain below the level of echo disturbance. Thus, the initial time delay gap, rather than the timing of the final delay, was found to be crucial in this regard. The acceptable time delay is also a function of the gain of the delay. For the gains used herein, a range of between 15 and 25 milliseconds (ms) was found useful for the initial time delay gap.

The duration between each successive delay was selected to be within a range so that each delay would not be heard as a separate sound. For the circuit described herein, a range of 5 to 10 ms between each successive delay was found to be ideal.

In order for head related transfer function to create a sensation of increased auditory spaciousness, 30 ms was determined as the minimum value for the timing of the final delay. This is in line with research into the effect of early reflections in concert halls.

Based on these considerations, four sets of time delays were determined for minimum and maximum of delay produced by the delay devices 54, 56, 58 and 60:

|    | Delay 54 | Delay 56 | Delay 58 | Delay 60 |
|----|----------|----------|----------|----------|
| A: | 15       | 20       | 25       | 30       |
| B: | 15       | 25       | 35       | 45       |
| C: | 25       | 30       | 35       | 40       |
| D: | 25       | 35       | 45       | 55       |

The first sets A and B use a 15 ms initial time delay, and sets C and D use a 25 ms time delay. Intermediate values could also be used, depending on the effect desired. For creating an effective sensation of stereo, A and B work better for speech but not as well for music as do C and D. This is because the threshold for echo disturbance for music is higher than compared to speech. A user interface would allow setting the initial time gap with a knob between 15 and 25 ms and the gap between successive reflections between 5 and 10 ms.

Figure 8:
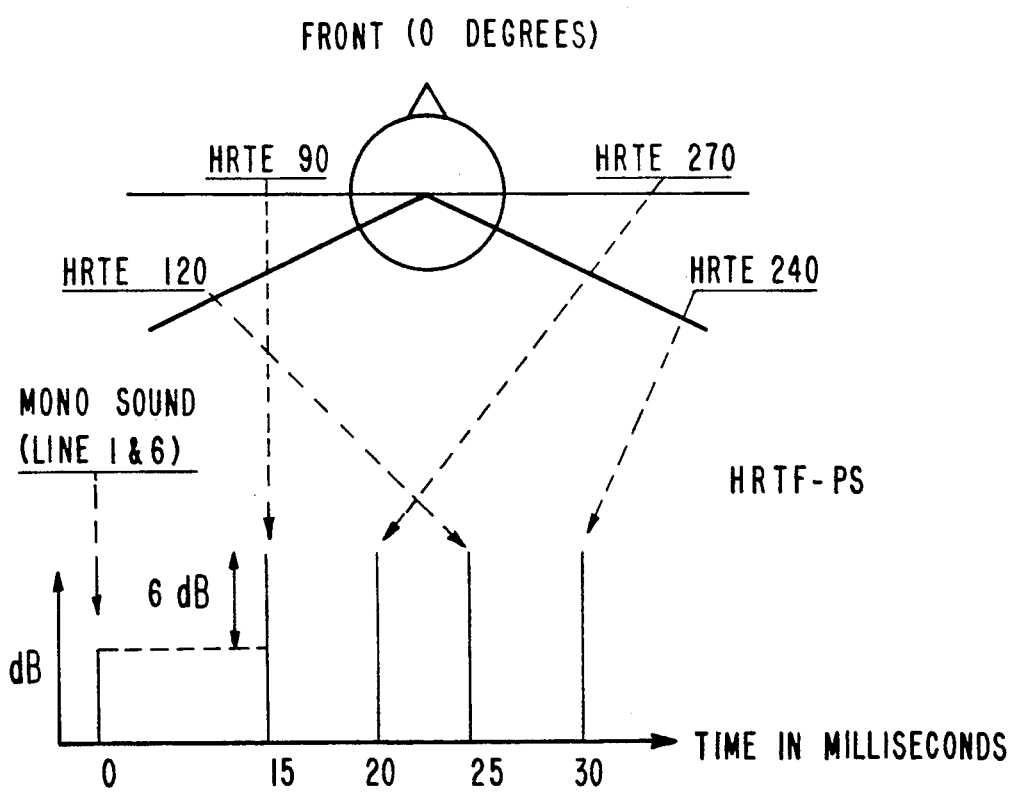
FIG. 8 is a schematic view showing angle of incidence and sequence of delays according to the present invention.

There are three considerations in the implementation of the HRTF filters used: the angle of incidence synthesized for the particular delay; the sequence of arrival; and the phase and frequency response to the filters. The angles of incidence used are illustrated in FIG. 8. These angles are based on measurements made at 0° elevation ("ear level"). These angles are chosen because of symmetry (90-270 and 240-120), location to the sides (to produce a stereo effect, filters measured at the locations of a virtual stereo speaker produces the best results), and the angles are maximally incoherent with regard to the unfiltered monaural source. The sequence is arranged so the sound delays alternate twice from left, then right. This is done so as not to weight the sound image towards one particular side.

The FIR filters used according to the present invention are created with a filter design program, based on an algorithm described by McClellan, Parks and Rabiner in their article "FIR Linear Phase Filter Design Program" (in *Programs for Digital Signal Processing* (1979; New York, IEEE Press)). This is a commonly used algorithm available in several filter design software packages. Each filter uses a 75 tap symmetrical arrangement of coefficients, resulting in a linear phase response. Linear phase filters are desirable in that they do not distort the time response of the waveform. If all filters used are of linear phase, as with the HRTF filter network of the present invention, then there is no chance of the combining of the output signals in such a way that their time responses interact constructively or non-constructively.

The pseudo-stereophony effect of the present invention can be implemented into hardware using off-the-shelf integrated circuit chips, such as a Motorola 56001 DSP chip. All of the processing described with respect to FIG. 2 can be accomplished with these or equivalent DSP chips.

In the aforementioned embodiment of pseudo-stereophony, only four HRTF filter networks were used. However, a larger number of delay-gain-HRTF filter networks could be added in an alternative embodiment. Fewer or greater number of coefficients used to represent the HRTFs used in FIR filters 78 and 80 could also be part of an alternative embodiment.

Other embodiments of the invention may or may not provide a user interface for gain level and time delays, as mentioned above.

The results of the present invention provide advantages over the prior art. For example, the signal from each channel sounds less "colored" (i.e., timbrally altered) than with previous methods. Also, a pseudo-stereo image can be had from a wide range of listening positions, as a result of the complex frequency response interaction of the filters. Previous methods require a more fixed listening position. The two output channels of the present invention can also be mixed to monaural (one channel) without disturbing coloration effects that result from phase cancellation. Moreover, the sound image has an increased dimension of spaciousness. This results from the resultant decorrelation of the two output signals. The present invention also allows multiple inputs with differential frequency responses to be more easily distinguished from one another, compared to monaural listening.

Numerous modifications and adaptations of the present invention will be apparent to those so skilled in the art and thus, it is intended by the following claims to cover all such modifications and adaptations which fall within the true spirit and scope of the invention.

I claim:

1. An apparatus for producing pseudo-stereophonic sound from a monaural signal comprising:
    a monaural source having a first speaker disposed in an anechoic room and having a sound output generated by the monaural signal;
    a second, third, fourth and fifth speaker disposed in the anechoic room substantially symmetrically about a listener having two ears;
    signal processing means for receiving the monaural signal from the source and outputting processed signals to each of the second, third, fourth and fifth speakers, each speaker producing a sound output corresponding to the received processed signal; and
    a pair of microphones, one disposed in each ear of the listener for receiving the sound outputs of the first, second, third, fourth and fifth speakers and producing two differentiated audio channels.

2. An apparatus according to claim 1, wherein the signal processing means includes a gain unit which increases the monaural signal and four variable delay units, one corresponding to each of the second, third, fourth and fifth speakers.

3. An apparatus according to claim 2, wherein the second, third, fourth and fifth speakers are disposed, at 90°, 120°, 240° and 270° azimuth, respectively.

4. An apparatus according to claim 2, wherein the gain unit increases the monaural signal delivered to each of the second, third, fourth and fifth speakers by about 6dB.

5. An apparatus for producing pseudo-stereophonic sound from a monaural signal comprising:
    an A/D converter for receiving the monaural signal and producing a digitized output signal;
    means for distributing the digitized output signal across six lines to produce six digital signals;
    a left and a right summation device, each receiving one of the six digital signals;
    four delay devices, each receiving one of the four remaining digital signals and outputting four different delayed signals;
    multiplier means for multiplying the four different delayed signals by a common value;
    filtering means for filtering each of the four multiplied signals to produce left and right output channel signals;
    the left output channel signals being delivered to the left summation device and being summed with the unprocessed digital signal delivered thereto, and the right output channel signals being summed in the right summation device with the unprocessed digital signal delivered thereto;
    a D/A converter receiving the summed left and right output channel signals and outputting two differentiated audio channels.

6. An apparatus according to claim 5, wherein the filtering means includes four filter networks, each associated with one of the prior delayed signals, wherein each filter network includes two FIR filters having an impulse frequency response matching ipsilateral and contralateral head related transfer functions of an average listener and a linear phase response, each of the two FIR filters producing one of the left and right output channel signals.

7. A method of producing a pseudo-stereophonic sound from a monaural signal comprising the steps of:
    feeding a monaural input signal to an A/D converter to produce a digitized output signal;
    distributing the digitized output signal across six lines to produce six digital signals;
    passing a first of the six signals to a left summation device;
    passing a second of the six signals to a right summation device;
    passing each of the remaining four signals through individual delay devices to establish four different delay signals;
    outputting the four different delay signals by a common value;
    filtering each of the four applied signals through FIR filters having an impulse frequency response matching ipsilateral and contralateral head related transfer functions of an average listener and a linear phase response to produce left and right output channel signals;
    summing the left output channel signals with the first unprocessed digital signal in the left summation device;
    summing the right output signals with the second unprocessed digital signal in the right summation device; and
    converting the summed left and right output channel signals in a D/A converter to produce analog left and right output channel signals.

8. A method according to claim 7, wherein the four different delayed signals are multiplied by a gain amount of about 6 dB.

9. A method according to claim 8, wherein the FIR filters correspond to four different angles of incidence including 90°, 120°, 240° and 270°, and wherein the delay for the 90° filter is 15 ms, the delay for the 270° filter is for 20 ms, the delay for the 120° filter is 25 ms and the delay for the 240° filter is 30 ms.

10. A method according to claim 8, wherein the FIR filters correspond to four different angles of incidence including 90°, 120°, 240° and 270°, and wherein the delay for the 90° filter is 15 ms, the delay for the 270° filter is for 25 ms, the delay for the 120° filter is 35 ms and the delay for the 240° filter is 45 ms.

11. A method according to claim 8, wherein the FIR filters correspond to four different angles of incidence including 90°, 120°, 240° and 270°, and wherein the delay for the 90° filter is 25 ms, the delay for the 270° filter is for 30 ms, the delay for the 120° filter is 35 ms and the delay for the 240° filter is 40 ms.

12. A method according to claim 8, wherein the FIR filters correspond to four different angles of incidence including 90°, 120°, 240° and 270°, and wherein the delay for the 90° filter is 25 ms, the delay for the 270° filter is for 35 ms, the delay for the 120° filter is 45 ms and the delay for the 240° filter is 55 ms.

* * * * *